(12) United States Patent
Song et al.

(10) Patent No.: US 8,644,872 B2
(45) Date of Patent: Feb. 4, 2014

(54) CONTINUOUS BROADCAST INTERFACE MAINTENANCE FOR GROUP COMMUNICATIONS TO WIRELESS COMMUNICATIONS DEVICES

(75) Inventors: Bongyong Song, San Diego, CA (US); Harleen Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 757 days.

(21) Appl. No.: 12/212,537

(22) Filed: Sep. 17, 2008

(65) Prior Publication Data

US 2009/0082049 A1    Mar. 26, 2009

Related U.S. Application Data

(60) Provisional application No. 60/974,838, filed on Sep. 24, 2007, provisional application No. 60/974,839, filed on Sep. 24, 2007.

(51) Int. Cl.
*H04B 7/00*    (2006.01)

(52) U.S. Cl.
USPC .......................................... 455/518; 455/519

(58) Field of Classification Search
USPC .................................. 455/518–521
See application file for complete search history.

(56) References Cited

U.S. PATENT DOCUMENTS

| | | | |
|---|---|---|---|
| 6,477,150 | B1 | 11/2002 | Maggenti et al. |
| 7,110,377 | B2 * | 9/2006 | Hsu et al. ...................... 370/331 |
| 7,170,863 | B1 | 1/2007 | Denman et al. |
| 7,453,837 | B2 * | 11/2008 | Jiang et al. ................... 370/320 |
| 7,991,396 | B2 * | 8/2011 | Wang et al. ................. 455/435.1 |
| 2003/0026240 | A1 * | 2/2003 | Eyuboglu et al. ............. 370/349 |
| 2003/0145064 | A1 * | 7/2003 | Hsu et al. ...................... 709/219 |
| 2003/0157945 | A1 * | 8/2003 | Chen et al. .................... 455/458 |
| 2003/0235181 | A1 | 12/2003 | Semper et al. |
| 2004/0198371 | A1 | 10/2004 | Balasubramanian et al. |

(Continued)

FOREIGN PATENT DOCUMENTS

| | | |
|---|---|---|
| JP | 2005130481 A | 5/2005 |
| JP | 2005528036 | 9/2005 |

(Continued)

OTHER PUBLICATIONS

"Push-to-Talk Over Cellular (POC); Architecture; POC Release 1.0", Aug. 1, 2003, Architecture V1.1.0, XX, XX, XP000863835.

(Continued)

*Primary Examiner* — Raymond Dean
(74) *Attorney, Agent, or Firm* — Raphael Freiwirth

(57) ABSTRACT

A system, method, and computer device that selectively maintain an open broadcast interface to a communication control device that is controlling wireless communication to at least one wireless communication device that is configured to receive group-directed communications for a communication group, such as a push-to-talk (PTT) group. In one embodiment, the wireless communication device registers at the communication control device, such as a base station controller, and at least one broadcast interface is established between the communication control device and another computer device, such as a broadcast A10 interface with a broadcast serving node (BSN). The communication control device maintains the broadcast interface while the wireless communication device configured to receive group-directed communications is registered such that group-directed broadcast communications can more rapidly be delivered to the wireless communication device. When the communication control device determines that the group communication has ended, it releases the broadcast interface.

35 Claims, 5 Drawing Sheets

(56) References Cited

U.S. PATENT DOCUMENTS

| | | |
|---|---|---|
| 2005/0075107 A1 | 4/2005 | Wang et al. |
| 2005/0085234 A1 | 4/2005 | Wang et al. |
| 2007/0197249 A1 | 8/2007 | Ross et al. |
| 2007/0233889 A1* | 10/2007 | Guo et al. ............ 709/231 |
| 2007/0291756 A1* | 12/2007 | Akhtar et al. ........ 370/392 |
| 2009/0082048 A1 | 3/2009 | Song et al. |

FOREIGN PATENT DOCUMENTS

| | | |
|---|---|---|
| JP | 2005535156 A | 11/2005 |
| JP | 2006500869 | 1/2006 |
| JP | 2009510831 A | 3/2009 |
| WO | WO03069928 | 8/2003 |
| WO | 2005/112494 | 11/2005 |
| WO | 2007/011271 | 1/2007 |
| WO | WO2007037922 A2 | 4/2007 |

OTHER PUBLICATIONS

International Search Report, PCT/US2008/076985, International Searching Authority, European Patent Office, Mar. 27, 2009.

Written Opinion, PCT/US2008/076985, International Searching Authority, European Patent Office, Mar. 27, 2009.

International Preliminary Report on Patentability, PCT/US2008/076985, International Preliminary Examining Authority, European Patent Office, Dec. 7, 2009.

* cited by examiner

CONTINUOUS BROADCAST INTERFACE MAINTENANCE FOR GROUP COMMUNICATIONS TO WIRELESS COMMUNICATIONS DEVICES

CLAIM OF PRIORITY UNDER 35 U.S.C. §119

The present Application for Patent claims priority to Provisional Application No. 60/974,838, entitled "CONTINUOUS INTERFACE MAINTENANCE FOR GROUP COMMUNICATIONS TO A WIRELESS COMMUNICATION DEVICE GROUP", filed Sep. 24, 2007, and to Provisional Application No. 60/974,839, entitled "CONTINUOUS BROADCAST INTERFACE MAINTENANCE FOR GROUP COMMUNICATIONS TO WIRELESS COMMUNICATION DEVICES", filed Sep. 24, 2007, each of which is assigned to the assignee hereof and hereby expressly incorporated by reference herein in its entirety.

BACKGROUND OF THE INVENTION

1. Field of the Invention

The present invention relates to point-to-point or point-to-multipoint wireless communications systems. More specifically, the present invention relates to a system and method for maintaining an open and continuous broadcast interface a communication control device for group communications, such as push-to-talk (PTT) communications, to wireless communication devices that have communications supported by the communication control device.

2. Description of the Related Art

In cellular wireless telecommunications, there have been several standards implemented regarding the creation and functionality of the communication infrastructure. One of the more recent standards is CDMA2000, where CDMA is an abbreviation for "code division multiple access." CDMA2000 supports a Broadcast-Multicast Service (BCMCS), which allows optimization of the radio interface for delivery of BCMCS content stream(s) to one or more wireless communication devices in one or more regions of an cellular carrier's network. The CDMA2000 protocol allows for both voice and data to be transmitted to and from wireless communication devices and determines the appropriate resource allocation for communications, both to and from the wireless telecommunication device and the radio access network (RAN), and in between communication control devices, such as base stations, packet data serving nodes (PDSN), and broadcast serving nodes (BSN).

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

It is important to have a very fast setup of the signal path of the PTT call because of the desired immediacy of the voice communication. Accordingly, it would be advantageous to provide a system and method to expedite PTT communication setup and communication with a target wireless communication device given the time-sensitivity of the communication. Such system and method can advantageously utilize existing cellular network infrastructure that would otherwise have latency delays in PTT communications. It is thus to the provision of such a system and method to expedite communications with a wireless communication device that the present invention is primarily directed.

SUMMARY OF THE INVENTION

Embodiments of the invention include systems, methods, and computer devices that selectively maintain an open broadcast interface to a communication control device that is controlling wireless communication to at least one wireless communication device that is configured to receive group-directed communications for a communication group, such as a push-to-talk (PTT) group. In one embodiment, the wireless communication device registers at the communication control device, such as a base station controller, and at least one broadcast interface is established between the communication control device and another computer device, such as a broadcast A10 interface with a broadcast serving node (BSN). The communication control device maintains the broadcast interface while the wireless communication device configured to receive group-directed communications is registered such that group-directed broadcast communications can more rapidly be delivered to the wireless communication device. When the communication control device determines that the group communication has ended, it releases the broadcast interface.

DETAILED DESCRIPTION OF THE INVENTION

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

Furthermore, the present invention is shown in several embodiments here as operating in a CDMA2000 network architecture. Reference can be had to the known standards and construction of CDMA2000 systems and network interfaces as would be known to one of skill in the art.

Figure 1:
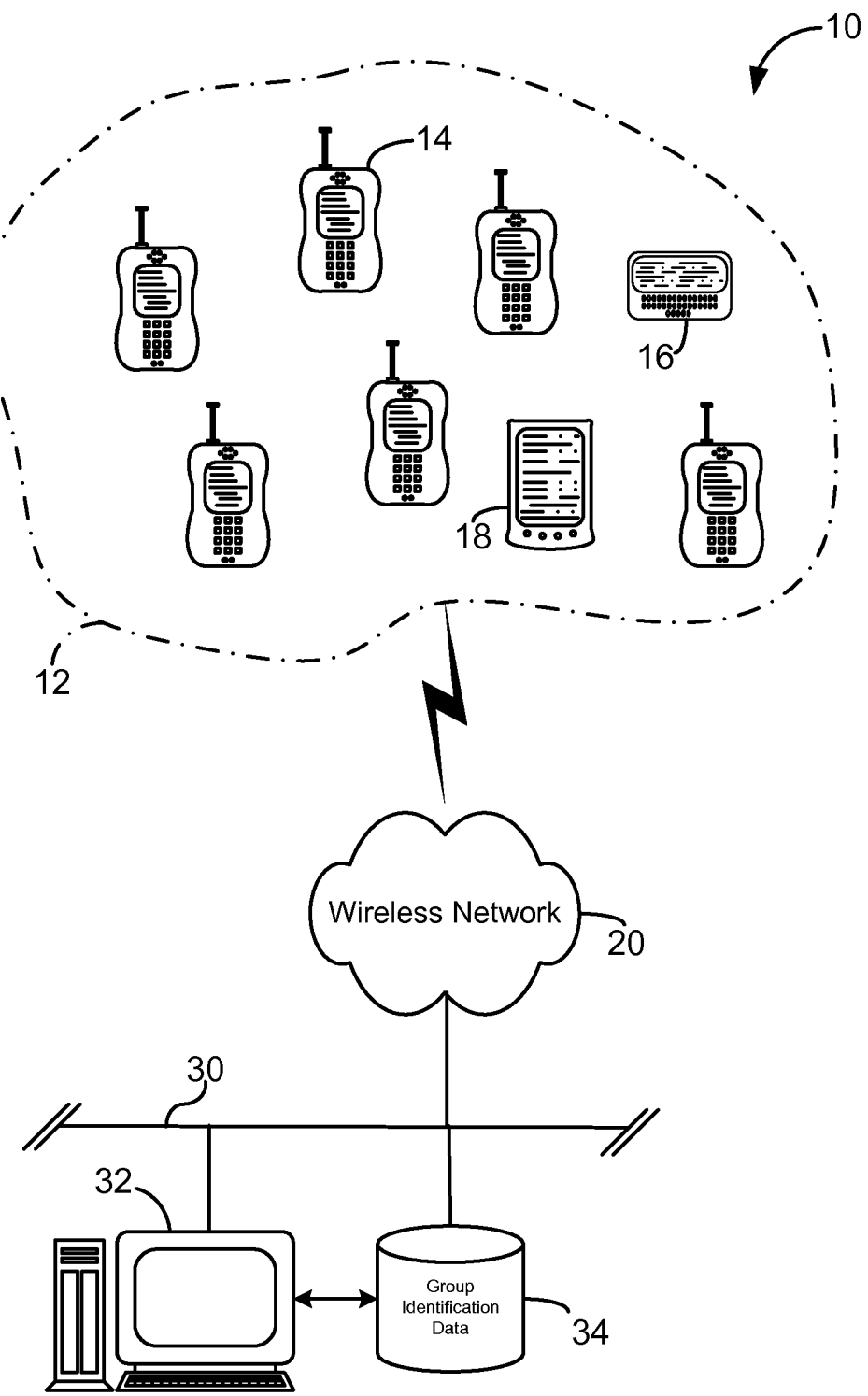
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of a system 10 for with a group communication server 32 to one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share is with other computer devices resident on the server-side LAN 30 or accessible across the wireless network 20. The group communication computer device 32 can have an attached or accessible database 34 to store the group identification data for the wireless devices. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In overview, the system 10 selectively communicates to a wireless communication device 14,16,18 for a group communication across the wireless communication network 20 with the a group communication server 32 configured to receive a request at to establish a group communication with at least one target wireless communication device (e.g. mobile telephone 14), and the group communication server 32 send a request to the at least one target wireless communication device across the wireless communication network 20 indicating an incoming group communication. An intermediate computer device (such as base station controller 64 in FIG. 2) receives an access channel communication packet across an access channel from the at least one target wireless communication device that received the request to establish a group communication from the group communication server 32. The access communication packet indicates the whether or not there are bundled messages present in the packet, such as messages indicating the resources for the group communication to the at least one wireless communication device 14. Through the bundling of messages, the wireless communication device 14,16,18 can quickly send messages indicating the ability to handle the incoming communication, without the other computer device (such as base station 60) needing to examine all messages send from the wireless communication device 14,16,18 for bundled messages.

The group communication can be voice, applications, graphic media, such as pictures in JPEG, TIF, and the like, or audio files such as MP3, MP4, WAV, and the like. The media can also be streaming media, such as a multimedia application (Powerpoint, MOV file, and the like). Also, the group communication is typically half-duplex audio conferencing among members of the communication group 12.

Figure 2:
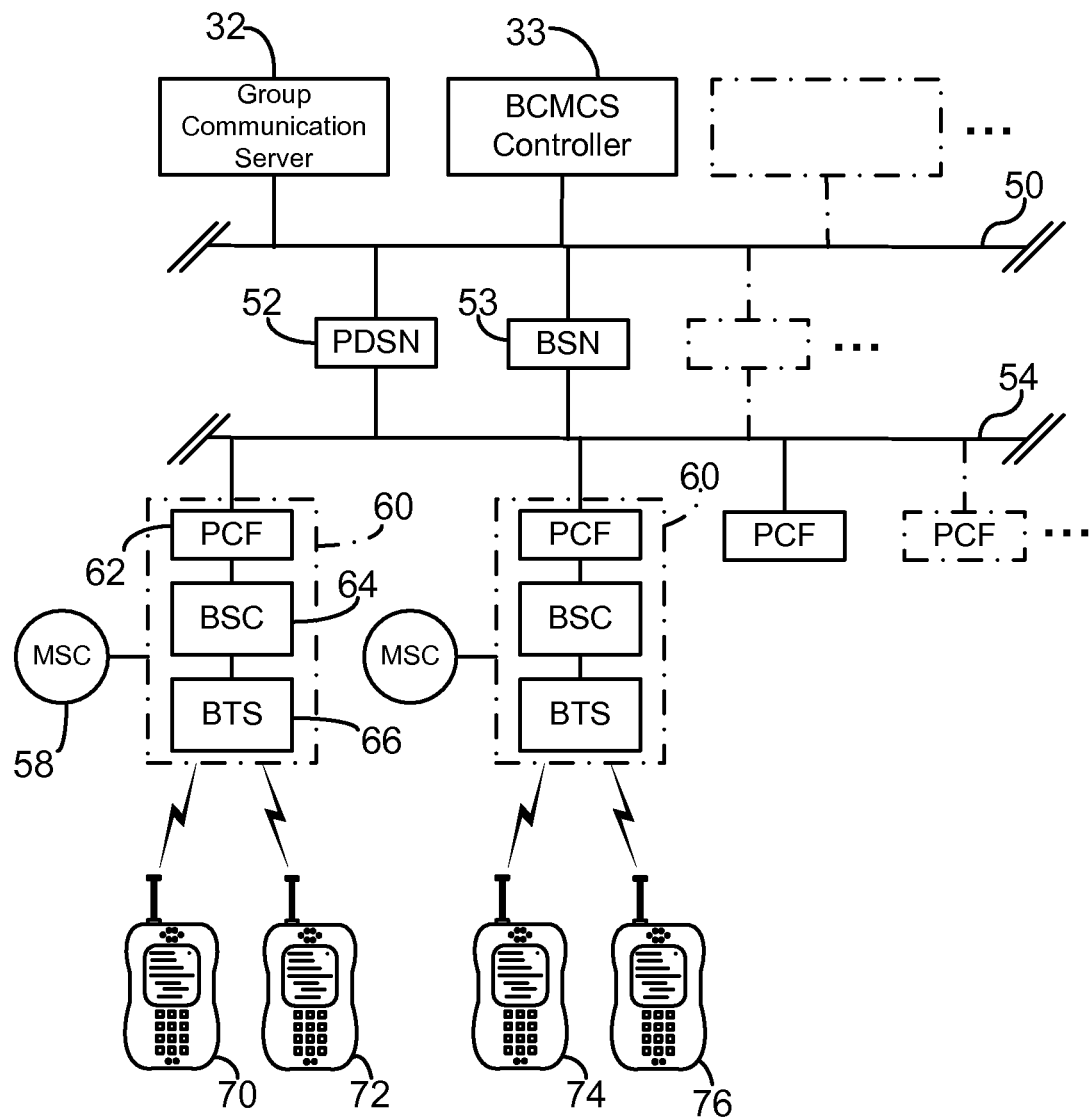
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices, such as group communication server 32 that controls communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option. Also shown on LAN 50 is a BCMCS Controller 33, the functionality of which is more fully set forth below in FIGS. 4 and 5.

The group communication server 32 are connected to a wireless service providers packet data service node (PDSN) such as PSDN 52, and/or a broadcast serving node 53 shown here resident as on a carrier network 54. Each PSDN 52 or BSN 53 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the base transceiver station (sometimes referred to as "branch-to-source")(BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such group-direct communications will occur through, or be at the control of, the group communication server 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
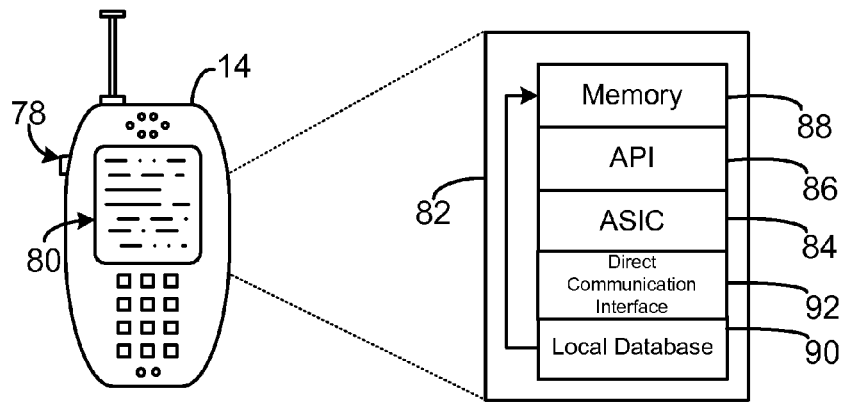
FIG. 3 is a block diagram illustrating the computer platform of the wireless telecommunication device embodied with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group communications. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 26, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless device, the computer platform 82 also includes a direct communication interface 92 that can open the direct communication channel from the wireless device, typically for the half-duplex voice communication in a PTT call. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
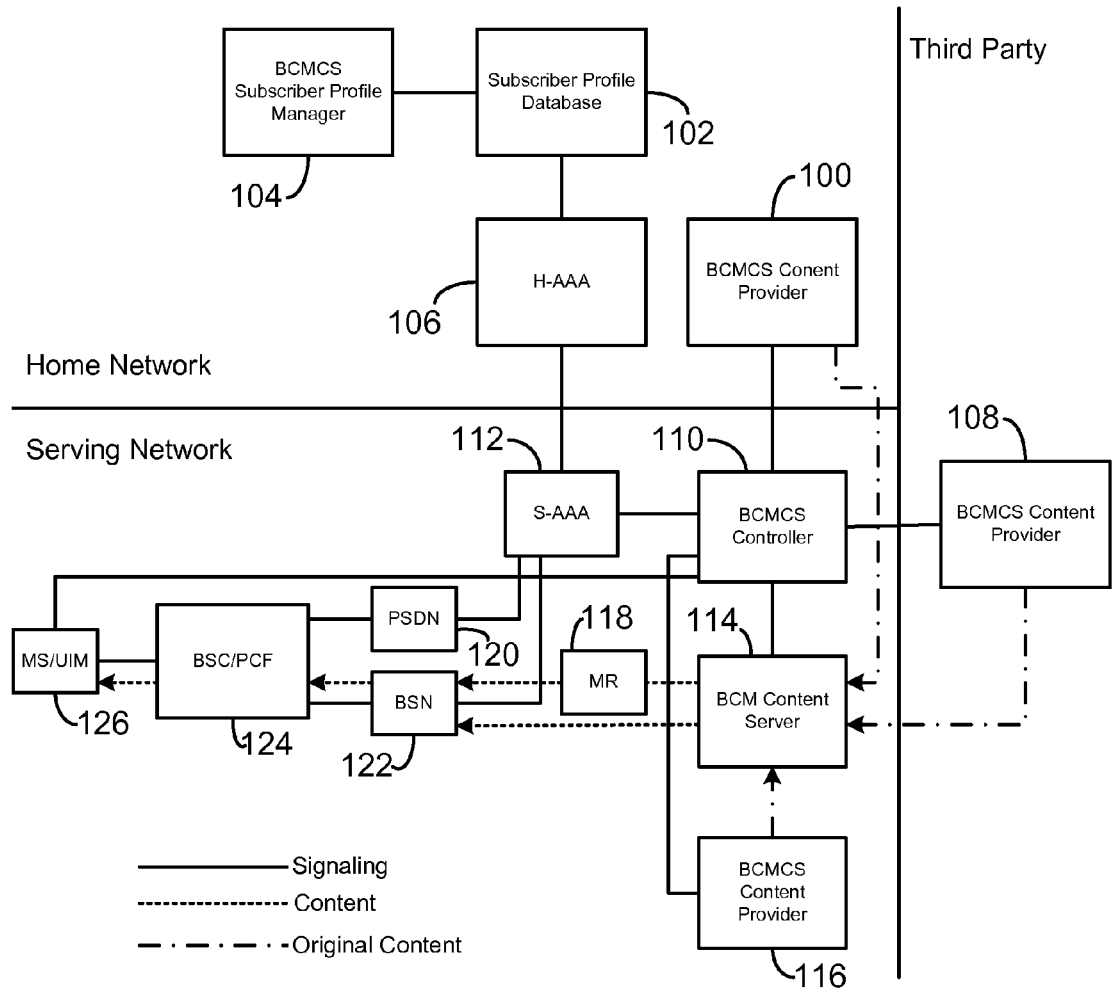
FIG. 4 is a block diagram illustrating one embodiment of BCMCS data streaming in a CDMA2000 architecture.

FIG. 4 is a block diagram illustrating one embodiment of BCMCS data streaming in a CDMA2000 architecture. Shown here are the potential home network, serving network, and third party locations with various resident elements. A BCMCS Controller 110 is responsible for managing and providing the BCMCS session information to the BSN 122 (via the SAAA 112), the BCMCS Content Server, the mobile station 126 (via the PDSN 120 function) and the RAN (via the BSN 122 function). The BCMCS Controller 110 may perform discovery operations to assist the mobile station 126 to find desired content.

BCMCS Content Server 114 makes BCMCS content available within an IP Multicast stream. It should be noted that the BCMCS Content Server 114 in the serving network is not necessarily the creator or source of the content, but is the last application level entity to manipulate (e.g., reformat) the content prior to the content reaching the BSN 122. The BCMCS Content Server 114 may store and forward the content from the BCMCS Content Provider 100,108, and/or merge the content from the multiple content providers. If higher layer encryption is enabled, the BCMCS Content Server 114 encrypts the stream content. In this embodiment, the BCMCS Content Provider 108 at a third party location is the creator or source of the content.

The BCMCS Subscriber Profile Manager 104 is an application that updates the subscriber profile in the Subscriber Profile Database 102 regarding subscribed BCMCS services. The user may interface to this application directly, or the carrier operator may reserve access to this application to their customer service agents. The interface between the user and the BCMCS Subscriber Profile Manager 104, and the interface between the BCMCS Subscriber Profile Manager 104 and the Subscriber Profile Database 102 are shown only for illustrative purposes of a common network configuration. The H-AAA 106 and S-AAA 112 are elements responsible for BCMCS authentications, authorizations, and accounting, and access the Subscriber Profile Database 102 to obtain information from the BCMCS user profile.

The PDSN 120 communicates using the unicast packet data service for packet data session establishment, to add and remove IP flows, etc., and acts as the first-hop router for IP traffic to and from the mobile station (MS) 126. The BSN 122 communicates with the BSC/PCF 124 to add and remove Multicast IP Flows. The BSN 122 may use IP multicast protocols to manage bearers supporting Multicast IP Flow between itself and the nearest router connecting back to the BCMCS Content Server 114. It also applies the flow treatment received from the BCMCS Controller 110 to the Multicast IP Flows. The multicast router MR 118 is optional entity used if the content is transmitted over a provisioned tunnel between the BSN 122 and the BCMCS Content Server 114. In this embodiment, this entity is responsible for performing the BCMCS Information Acquisition, BCMCS registration, and receiving Multicast IP flows. The BSC/PCF 124 are responsible for signaling, establishing, and tearing down bearer channels between the BSN 122 and the MS 126. The BSC 124 chooses the "best" bearer channel to the MS 126 based on considerations such as optimization of resources, and required quality-of-service ("QOS").

The interface between BCMCS Controller 110 and BSN 122 via S-AAA 112 provides BCMCS session related information such as Flow Treatment (e.g., Header Compression), relevant QOS parameters such as required bandwidth, the mapping between BCMCS Flow ID and Multicast IP address and port number from the BCMCS Controller 110 to the BSN 122 via a predefined protocol. This interface also exchanges the BCMCS authorization information for BCMCS registration. The interface between BSN 122 and S-AAA 112 the BSN 122 will typically generate accounting information for the content flows. And the interface between BCMCS Controller and S-AAA. This interface provides the BCMCS Controller 110 with authentication and authorization information. The S-AAA 112 may send BCMCS user profile received from the H-AAA 106 to the BCMCS Controller 110 during BCMCS Information Acquisition triggered by the MS 126. The BCMCS Controller 110 may also send accounting information to the S-AAA 112. The S-AAA 112 may also be used to relay the BCMCS session related information between the BSN 122 and BCMCS Controller 110.

The interface between BCMCS Controller 110 and BCMCS Content Provider 100,108 interface exchanges information including Content Provider Name, Program Name, session description (e.g., codec type), and security information, etc. This interface may also exchange the start time of the BCMCS session and duration of the BCMCS session. The interface between BCMCS Controller 110 and BCMCS Content Server 114 may exchange the security information, multicast IP Address and port number, and content management information (e.g., the start time of the BCMCS session and duration of the BCMCS session). The BCMCS Controller 110 uses this interface to add, modify, or remove BCMCS flows and this interface also provides a mechanism for message authentication of the BCMCS Content Server 114 and BCMCS controller 110 and protects integrity of its messages.

The interface between BCMCS Controller 110 and MS/UIM 126 provides the BCMCS client application in the MS 126 with access to information about available BCMCS sessions: typically including a Program Name, BCMCS Flow ID(s), broadcast access key (BAK)(s) and BAK Expiry time if the Multicast IP Flow(s) are encrypted, start time of the BCMCS session, duration of the BCMCS session, flow treatment (e.g., header compression), and session description (e.g., 36 codec type). The PCF 124 initiates setup of an A10 connection by sending an A11-Registration Request message to the PDSN 129. The A11-Registration Request message contains the extensions specified in the CDMA2000 standard. The A11-Registration Request message may be retransmitted a configurable number of times, and if the connection setup request is acceptable, the PDSN 120 updates its binding record for the A10 connection by creating an association between the PDSN Session Identifier (PDSN SID) and the IMSI address, PCF-Address and PDSN-Address information. The PSDN SID is identical to the PCF Session Identifier (PCF SID). If the either the PCF or the PDSN does not support the appropriate Session Identifier Version, the PDSN may choose any PDSN SID.

The PCF 124 and the PDSN 120 use the PCF-IP-Address and the PDSN-IP-Address returned in the A11-Registration Reply message as the A10 connection for the transport of user traffic. The PCF-IP Address and the PDSN-IP-Address form the unique link layer ID for each A10 connection. The PCF 124 and the PDSN 120 maintain an association of the mobile's IMSI address with the A10 connection. The release of an A10 connection is typically controlled by the PCF 124, however, the PDSN can also initiate A10 connection release, the PDSN 120 can requests that the PCF 124 release the connection.

Figure 5:
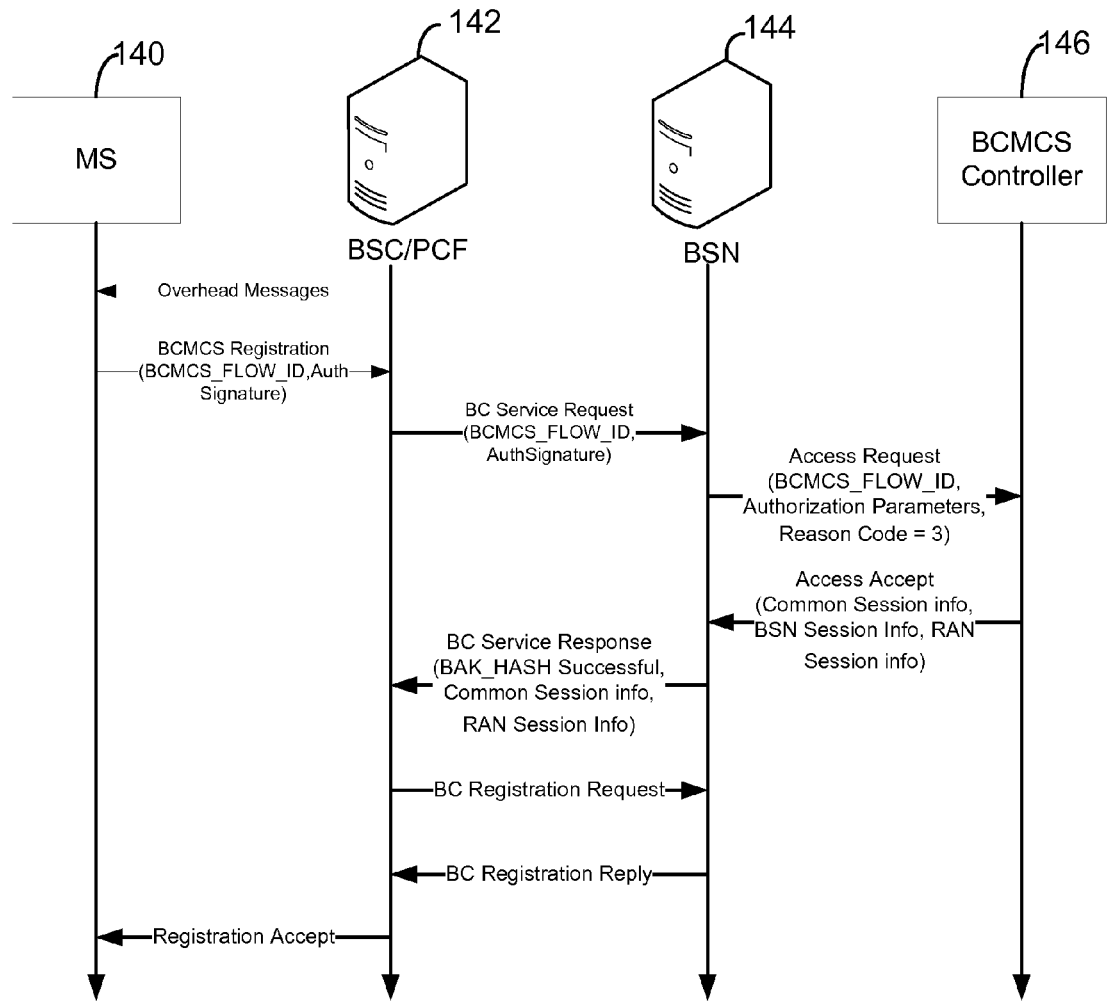
FIG. 5 is a call flow diagram of one embodiment of the BCMCS Flow Registration creating a broadcast A10 interface between the BSC/PCF and the BSN.

FIG. 5 is shows one embodiment of the BCMCS Flow Registration creating a broadcast A10 interface between the BSC/PCF 142 and the BSN 144. The MS 140 receives content availability and radio parameter and information from the overhead messages. The MS 140 performs a BCMCS registration for BCMCS_FLOW_ID(s) with the authorization signature included. If the BSC/PCF 142 has BAK information, the RAN may check BAK_HASH. The BSC/PCF 142 sends the A11 BC Service Request to the BSN 144 to request RAN session information and includes the BCMCS_FLOW_ID and the authorization signature.

The BSN 144 sends the remote authentication dial in user service ("RADIUS") Access-Request message to the S-AAA/BCMCS Controller 146. The message includes the BCMCS_FLOW_ID, Authorization Parameters, and Reason Code. In this example, the BSN 144 sets Reason 1 Code to 3 to indicate both authorization and BSN session information are needed. The BCMCS Controller 146 performs the authorization. Then the BCMCS Controller 146 sends the RADIUS Access-Accept message to the BSN 144 including BCMCS session information. The BSN 144 sends BC Service Response to the BSC/PCF 142 including BCMCS session information that the RAN needs. The RAN sends BC Registration Request to the BSN 144 to set up a broadcast A10 connection. The BSN 144 responds with BC Registration Response. The RAN sends Registration Accept to the MS 140. The BSN 144 may send an A11-BC-Registration Update message to the RAN in order to terminate the BCMCS flow(s). If the mapping is pre-provisioned information (BCMCS-FlowID; multicast IP addr/port) at the BSN 144, only the BC registration request and reply between the BSC/PCF 142 and BSN 144 are necessary.

Typically, three broadcast A10 interfaces are required for serving a PTT call, one for call announcement traffic, one for traffic, and one for non-media signaling. The broadcast A10 for PTT call (or other similar group call) announcement can be left open all the time. However, the remaining two A10 interfaces can be opened at the time of call setup if the connection establishment procedure is sufficiently fast. This contributes to minimizing the consumption of the broadcast A10 resources. The method for reducing the connection establishment delay is described in detail later. In the following, broadcast A10 interfaces refer to the broadcast A10 interfaces for traffic and non-media signaling unless otherwise stated.

Figure 6:
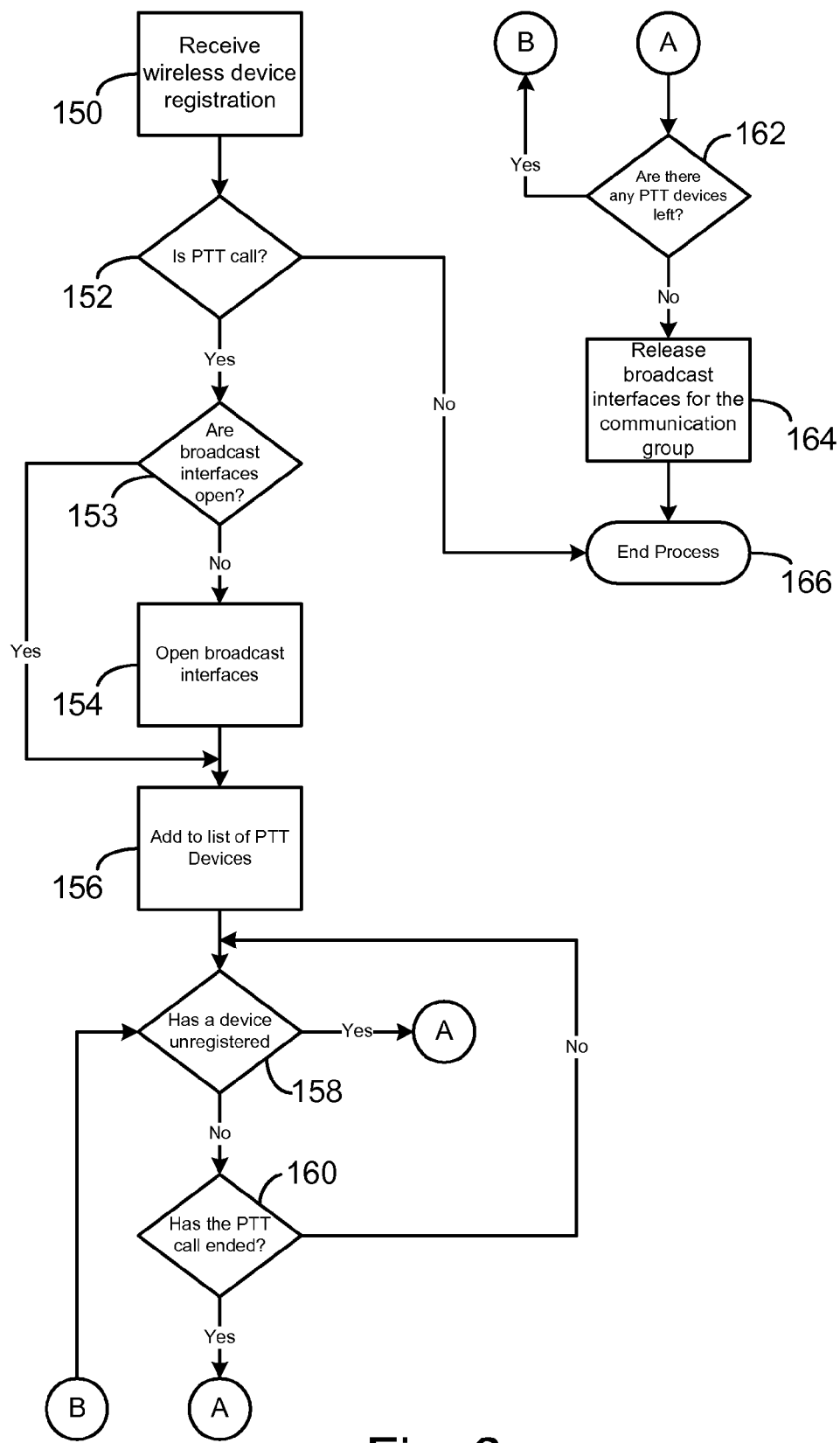
FIG. 6 is a flowchart of one embodiment of the process on the communication control device to maintain a continuous broadcast interface while at least one PTT-capable device is registered.

FIG. 6 is a flowchart of one embodiment of the process on the communication control device (such as BSC/PCF 124 in FIG. 4) to maintain continuous broadcast interfaces while at least one member device having PTT communication capability is registered during the PTT call. A registration is received from a wireless communication device 14,16,18, as shown at step 150, and then a determination is made as to whether the registration is for flows for a PTT (or other similar group communication) call, i.e., flows for PTT traffic and non-media signaling, as shown at decision 152. If the registration is not for flows for a PTT call, then a broadcast A10 connection is not needed open for that device at that moment, i.e. connections will be opened when communication to or from the wireless communication device is initiated, and the process terminates, as shown at termination 166. For convenience of explanation, it is assumed hereinafter that communication to or from the wireless communication device hasn't been initiated.

Otherwise, if the registration is for flows for a PTT call at decision 152, then communication control device checks if the interfaces for the call are already open, as shown at decision 153. If the interfaces are not open at decision 153, at least one broadcast interface is established, such as broadcast A10 interfaces for PTT traffic and non-media signaling, as shown at step 154, and then the registering PTT device is placed on a list of registered PTT capable wireless communication devices, as shown step 156. If there is a broadcast interface open at decision 153, then the process simply places the PTT device on the list at step 156. After the interfaces, such as broadcast A10 interfaces, are opened for the wireless communication device, then a determination is made as to whether the wireless communication device has unregistered, as shown at decision 158. If the wireless communication device has not unregistered at decision 158, a determination is made as to whether the PTT call has ended, as shown at decision 160. The communication control device can determine the termination of the PTT call after a certain duration of data inactivity. If the PTT call is still in progress, a wait state is entered at decision 158 and the interface remains open until a wireless communication device has unregistered.

Once the wireless communication device has unregistered at decision 158, then a determination is made as to whether there are any remaining members of the registered wireless communication devices having PTT capability are present, as shown at decision 162. If PTT devices remain at decision 162, the process thread returns to decision 158 to await another wireless communication device unregistering, thereby keeping the broadcast interface open. Otherwise, if no PTT device members on the list of the communication control device are registered at decision 162, then the broadcast interface is released as shown at step 164, and then the process terminates as shown at termination 166.

In order to accelerate the establishment process 152 of broadcast A10 interfaces, i) the mapping information (BC-MCSFlowID; multicast IP addr/port) is pre-provisioned at the BSN 144 and ii) the BCMCS authorization is either bypassed or pre-conducted when establishing the broadcast A10 interface for the PTT call announcement flow. By doing this, only the BC registration request and reply between the BSC/PCF 142 and BSN 144 are necessary to establish broadcast A10 interfaces for PTT traffic and non-media signaling flows.

It can thus be seen that system provides, in one embodiment, an inventive method for selectively maintaining an open broadcast interface to a communication control device that is controlling wireless communication to at least one of a plurality of wireless communication devices 14,16,18 that are in a communication group (PTT Group 12) through registering at least one wireless communication device 14 that is a member of a communication group (PTT Group 12) of wireless communication devices at the communication control device (BSC/PCF 142), the at least one wireless communication device 14 configured to receive group-directed communications for the communication group, and the at least one wireless communication device 14 selectively becoming unregistered from the communication control device, then establishing at least one broadcast interface between the communication control device and another computer device on the wireless communication network (such as a broadcast A10 being established between BSC.PCF 142 and BSN 144), the at least one broadcast interface permitting delivery of a group-directed communication to the at least one wireless communication device 14. Then maintaining the at least one broadcast interface while at least one wireless communication device 14 having group-directed communication capability is registered with the communication control device, and releasing at least one wireless one broadcast interface at the end of the group call.

In one embodiment, the communication control device (BSC/PCF 142) can further maintain a list of registered wireless communication devices, and upon a wireless communication device 14 being unregistered, remove the unregistered wireless communication device from the list. Establishing at least one broadcast interface can occur upon a group-directed communication directed to the at least one wireless communication device 14 being received at the communication control device (BSC/PCF 142), i.e. a incoming PTT call is being sent to the wireless communication device 14. And if so embodied, at least one wireless communication device 14 can be placed on the list upon a group-directed communication directed to the at least one wireless communication device 14 being received at the communication control device (BSC/PCF 142).

Is so embodied, the method can include determining if a wireless communication device 14 having group-directed communication capability is on the list, and wherein maintaining the at least one broadcast interface is for as long at least one wireless communication device 14 having group-directed communication capability is on the list, and releasing at least one wireless one broadcast interface at the end of the group call. Where the communication control device is a base station controller (BSC 142) and the other computer device is a broadcast serving node (BSN 144), establishing at least one interface can be establishing a broadcast A10 interface between the BSN 144 and the BSC 142.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A method for selectively maintaining a broadcast interface, comprising:
    registering one or more wireless communication devices to receive a group-directed communication for a given group communication call of a given type that is associated with a communication group of wireless communication devices;
    establishing at least one broadcast interface between a communication control device and another computer device on a wireless communication network, each broadcast interface configured to support delivery of the group-directed communication to more than one target wireless communication device;
    maintaining the at least one broadcast interface based on at least one of the one or more registered wireless communication devices remaining registered with the communication control device for the given group communication call; and
    releasing the at least one broadcast interface in response to a detection of termination of the given group communication call at the communication control device, wherein the given type is push-to-talk (PTT), wherein the maintaining and releasing steps are performed based on the given group communication call being a PTT call, and wherein the maintaining and releasing steps are not performed for one or more other call types that do not correspond to PTT calls.

2. The method of claim 1, comprising:
    maintaining a list of the one or more registered wireless communication devices associated with the group-directed communication and their routing information,
    wherein, upon detecting that a listed wireless communication device un-registers from the given group communication call, the maintaining 'the list step removes the unregistered wireless communication device from the list.

3. The method of claim 2, further comprising sending group-directed broadcast packets received on the at least one broadcast interface to the one or more registered wireless communication devices based upon the routing information from the list.

4. The method of claim 1, further comprising:
    determining that each of the one more or more registered wireless communication device unregisters from the given group communication call,
    wherein the releasing step occurs responsive to the determination.

5. The method of claim 2, wherein the at least one broadcast interface in response to group-directed communication data directed to the one or more registered wireless communication devices being received at the communication control device.

6. The method of claim 1, wherein the communication control device is a base station controller and the other computer device is a broadcast serving node, and wherein the at least one broadcast interface is a broadcast A10 interface between the broadcast serving node and the base station controller.

7. The method of claim 6, wherein mapping information is pre-provisioned at the broadcast serving node, further comprising bypassing a BCMCS authorization to establish the broadcast A10 interface.

8. The method of claim 6, wherein the broadcast A10 interface between the broadcast serving node and the base station controller is established by a BC registration request and reply between the base station controller and the broadcast serving node.

9. The method of claim 1,
    wherein the at least one broadcast interface is established in response to the one or more registered wireless communication devices engaging in the given group communication call,
    wherein the releasing step releases the at least one broadcast interface upon determining that the one or more registered wireless communication devices are no longer engaged in the given group communication call.

10. The method of claim 1, further comprising detecting, at the communication control device, a termination of the group-directed communication based upon a detection of a period of data inactivity.

11. A system for selectively maintaining an open broadcast interface to a communication control device that is controlling wireless communication to one or more wireless communication devices configured to engage in group-directed communications, the system comprising:
    the communication control device resident on a wireless communication network and selectively receiving communications from one or more wireless communication devices and selectively having the wireless communication devices registered therewith, and the communication control device further configured to establish interfaces between the communication control device and another computer device on the wireless communication network for permitting delivery of group-directed communications for a given group communication call of a given type to which the registered wireless communication devices are registered; and
    at least one wireless communication device that is a member of a communication group of wireless communication devices, the at least one wireless communication device configured to receive a group-directed communications for the communication group, and further configured to selectively register and unregister for the given group communication call at the communication control device that at least controls group communications thereto,
    wherein the communication control device further configured to establish and maintain at least one broadcast interface based on at least one wireless communication device configured to receive a group-directed communications being registered for the given group communication call with the communication control device, each broadcast interface configured to support delivery of the group-directed communications to more than one target wireless communication device; and the communication control device further configured to release the at least one broadcast interface when termination of the given group communication call is detected at the communication control device, wherein the given type is push-to-talk (PTT), wherein the communication control device is configured to perform the maintaining and releasing based on the given group communication call being a PTT call, and wherein the communication control device is configured to refrain from performing the maintaining and releasing for one or more other call types that do not correspond to PTT calls.

12. The system of claim 11, wherein the communication control device is further configured to maintain a list of registered wireless communication devices and their routing information, and upon a wireless communication device being unregistered, removes the unregistered wireless communication device from the list.

13. The system of claim 12, wherein the communication control device further configured to allow group-directed broadcast packets received on the at least one broadcast interface to be sent to a wireless communication device based upon the routing information from the list.

14. The system of claim 11, wherein the communication control device further configured to establish at least one interface upon a group-directed communication directed to the at least one wireless communication device being received at the communication control device.

15. The system of claim 11, wherein the communication control device further configured to release the at least one broadcast interface upon all wireless communication devices configured to receive group-directed communications registered at the communication control device becoming unregistered.

16. The system of claim 11, wherein the communication control device is a base station controller and the other computer device is a broadcast serving node, and wherein the broadcast interface is a broadcast A10 interface between the broadcast serving node and the base station controller.

17. The system of claim 16, wherein a mapping information is pre-provisioned at the broadcast serving node and a BCMCS authorization is bypassed to thereby establish the broadcast A10 interface.

18. The system of claim 16, wherein the broadcast A10 interface between the broadcast serving node and the base station controller is established by a BC registration request and reply between the base station controller and the broadcast serving node.

19. The system of claim 11, wherein the communication control device further configured to detect termination of the given group communication call after a certain period of data inactivity.

20. A communication control device resident on a wireless communication network comprising:
means for registering one or more wireless communication devices to receive a group-directed communication for a given group communication call of a given type that is associated with a communication group of wireless communication devices;
means for establishing at least one broadcast interface between the communication control device and another computer device on the wireless communication network, each broadcast interface configured to support delivery of the group-directed communication to more than one target wireless communication device;
means for maintaining the at least one broadcast interface based on at least one of the one or more registered wireless communication devices remain registered with the communication control device for the given group communication call; and
means for releasing the at least one broadcast interface in response to a detection of termination of the given group communication call at the communication control device, wherein the given type is push-to-talk (PTT), wherein the means for maintaining and the means for releasing are configured to perform the maintaining and releasing based on the given group communication call being a PTT call, and wherein the means for maintaining and the means for releasing are configured to refrain from performing the maintaining and releasing for one or more other call types that do not correspond to PTT calls.

21. The communication control device of claim 20, further comprising:
means for maintaining a list of the one or more registered wireless communication devices associated with the group-directed communication and their routing information,
wherein, upon detecting that a listed wireless communication device un-registers from the given group communication call, the means for maintaining 'the list removes the unregistered wireless communication device from the list.

22. The communication control device of claim 20, further comprising:
means for determining that each of the one more or more registered wireless communication device unregisters from the given group communication call,
wherein the means for releasing releases the at least one broadcast interface responsive to the determination.

23. The communication control device of claim 20,
wherein the means for establishing establishes the at least one broadcast interface in response to group-directed communication data directed to the one or more registered wireless communication devices being received.

24. The communication control device of claim 21, further comprising:
means for sending group-directed broadcast packets received on the at least one broadcast interface to the one or more registered wireless communication devices based upon the routing information from the list.

25. The communication control device of claim 20, wherein the communication control device is a base station controller and the other computer device is a broadcast serving node, and wherein the at least one broadcast interface is a broadcast A10 interface between the broadcast serving node and the base station controller.

26. The communication control device of claim 25, wherein mapping information is pre-provisioned at the broadcast serving node and a BCMCS authorization is bypassed to establish the broadcast A10 interface.

27. The communication control device of claim 25, wherein the broadcast A10 interface between the broadcast serving node and the base station controller is established by a BC registration request and reply between the base station controller and broadcast serving node.

28. The communication control device of claim 20, further comprising:
means for detecting termination of the given group communication call based upon a detection of a period of data inactivity.

29. A non-transitory computer-readable medium comprising instructions, which, when executed by a machine, cause the machine to perform operations, the instructions comprising:
- a set of instructions to selectively register one or more wireless communication devices at a communication control device to receive a group-directed communication for a given group communication call of a given type that is associated with a communication group of wireless communication devices;
- a set of instructions to establish at least one broadcast interface between the communication control device and another computer device on a wireless communication network, each broadcast interface configured to support delivery of the group-directed communication to more than one target wireless communication device;
- a set of instructions to maintain the at least one broadcast interface based on at least one of the one or more registered wireless communication devices remaining registered with the communication control device for the given group communication call; and
- a set of instructions to release the at least one broadcast interface in response to a detection of termination of the given group communication call at the communication control device, wherein the given type is push-to-talk (PTT), wherein the set of instructions to maintain and the set of instructions to release are configured to cause the machine to perform the maintaining and releasing based on the given group communication call being a PTT call, and wherein the set of instructions to maintain and the set of instructions to release are configured to cause the machine to refrain from performing the maintaining and releasing for one or more other call types that do not correspond to PTT calls.

30. A communication control device resident on a wireless communication network, comprising:
- a processor configured to:
  - register one or more wireless communication devices to receive a group-directed communication for a given group communication call of a given type that is associated with a communication group of wireless communication devices;
  - establish at least one broadcast interface between the communication control device and another computer device on the wireless communication network, each broadcast interface configured to support delivery of the group-directed communication to more than one target wireless communication device;
  - maintain the at least one broadcast interface based on at least one of the registered wireless communication devices remain registered with the communication control device for the given group communication call; and
  - release the at least one broadcast interface in response to a detection of termination of the given group communication call at the communication control device, wherein the given type is push-to-talk (PTT), wherein the processor is configured to perform the maintaining and releasing based on the given group communication call being a PTT call, and wherein the processor is configured to refrain from performing the maintaining and releasing for one or more other call types that do not correspond to PTT calls.

31. A method of setting up a connection at an access network, comprising:
- receiving, from an access terminal, a registration request that identifies a multicast call for which registration is requested;
- forwarding the received request to a server;
- determining, at the access network, that the received request is associated with an attempt by the access terminal to register to the multicast call; and
- establishing a broadcast interface on which to receive multicast traffic for delivery to multiple target access terminals during the multicast call in response to the determination; maintaining the broadcast interface during the multicast call; and releasing the broadcast interface in response to a detection that the multicast call is terminated, wherein the multicast call is determined to be a push-to-talk (PTT) call, wherein the maintaining and releasing steps are performed based on the PTT call determination, and wherein the maintaining and releasing steps are not performed for one or more other calls that do not correspond to PTT calls.

32. The method of claim 31, wherein the server corresponds to a broadcast serving node (BSN) that is independent of a packet data serving node (PDSN).

33. The method of claim 31, wherein the establishing step establishes the broadcast interface between the access network and a broadcast serving node (BSN) that is independent of a packet data serving node (PDSN).

34. The method of claim 31, wherein the broadcast interface corresponds to a broadcast A10 interface.

35. The method of claim 1,
- wherein a subset of available broadcast interface identifiers is reserved between the communication control device and an external broadcast interface identifier management device for calls that correspond to the given type, further comprising:
- determining that the given group communication call corresponds to the given type in conjunction with the registering; and
- selecting, from the reserved subset, at least one broadcast interface identifier for the at least one broadcast interface based on the determining,
- wherein the establishing step establishes the at least one broadcast interface using the selected at least one broadcast interface identifier while bypassing an attempt to authorize the selected at least one broadcast interface identifier with the external broadcast interface identifier management device based on its selection from the reserved subset.

* * * * *